United States Patent

[11] 3,611,156

[72] Inventor Michael H. E. Ward
Cambridge, England
[21] Appl. No. 776,729
[22] Filed Nov. 18, 1968
[45] Patented Oct. 5, 1971
[73] Assignee Pye Limited
Cambridge, England
[32] Priority Nov. 30, 1967
[33] Great Britain
[31] 54686/67

[54] BATTERY ECONOMY APPARATUS
5 Claims, 2 Drawing Figs.

[52] U.S. Cl. .......... 325/492, 307/247
[51] Int. Cl. .......... H04b 1/06
[50] Field of Search .......... 325/492, 410; 307/247, 251, 253, 291

[56] References Cited

UNITED STATES PATENTS

| | | | |
|---|---|---|---|
| 2,884,518 | 4/1959 | O'Neill .......... | 325/318 X |
| 2,912,574 | 11/1959 | Gensel .......... | 325/492 X |
| 3,488,596 | 1/1970 | Webster et al. .......... | 325/492 |

*Primary Examiner*—Robert L. Griffin
*Assistant Examiner*—R. S. Bell
*Attorney*—Holcombe, Wetherill & Brisebois

ABSTRACT: This invention provides a battery economizer circuit, particularly for a tone call radio receiver, wherein a multivibrator controls a semiconductor switch device for rendering the direct-current path to the receiver alternately conductive and nonconductive and the multivibrator has a repetition rate which may be altered, but in which the mark/space ratio remains substantially constant irrespective of the repetition rate.

BATTERY ECONOMY APPARATUS

This invention relates to apparatus for obtaining reduced power consumption from the direct-current supply for a radio receiver in the absence of a signal.

Battery economy in portable radio receivers may be achieved by the use of a multivibrator having a mark/space ratio of less than unity controlling a semiconductor switch in the supply line to a receiver, as described in U.S. Pat. No. 3,488,596 issued Jan. 6, 1970. The switching transistor may also act as the series-stabilizing element for a constant voltage supply to the receiver, as described in our copending U.S. Pat. application Ser. No. 776,730.

In such circuits good economy is achieved by making the ON/OFF (mark/space) ratio small, but there are certain limitations, viz:

a. The OFF time must normally be not greater than 500 milliseconds. A longer period than this would not be acceptable in a two-way speech communication system.

b. With careful design a receiver not using selective calling can become fully operative within 10 milliseconds from the application of the supply voltage, and therefore the minimum ON time is about 10 milliseconds.

c. When selective calling circuits using tone or digital means are employed, such circuits may take up to 200 milliseconds to respond, so requiring this period as the minimum ON time.

It can be seen therefore that a tone call receiver using such battery economizer circuits will be limited to an ON/OFF ratio of 1/2.5 whereas a receiver not using tone call can have greater economy as the ON/OFF ratio may be 1/50.

The object of the invention is to provide a tone call receiver with the same high order of economy as a receiver not using selective calling.

This is achieved, according to this invention, by providing a multivibrator in which the repetition rate may be altered but in which the mark/space ratio, i.e. economy, remains constant irrespective of the rate.

According to a preferred form of the invention, two serially connected capacitors are used as the frequency-determining capacitance of an emitter-coupled transistor, a stable multivibrator and one capacitor is effectively short circuited to lower the repetition rate or frequency.

Figure 1:
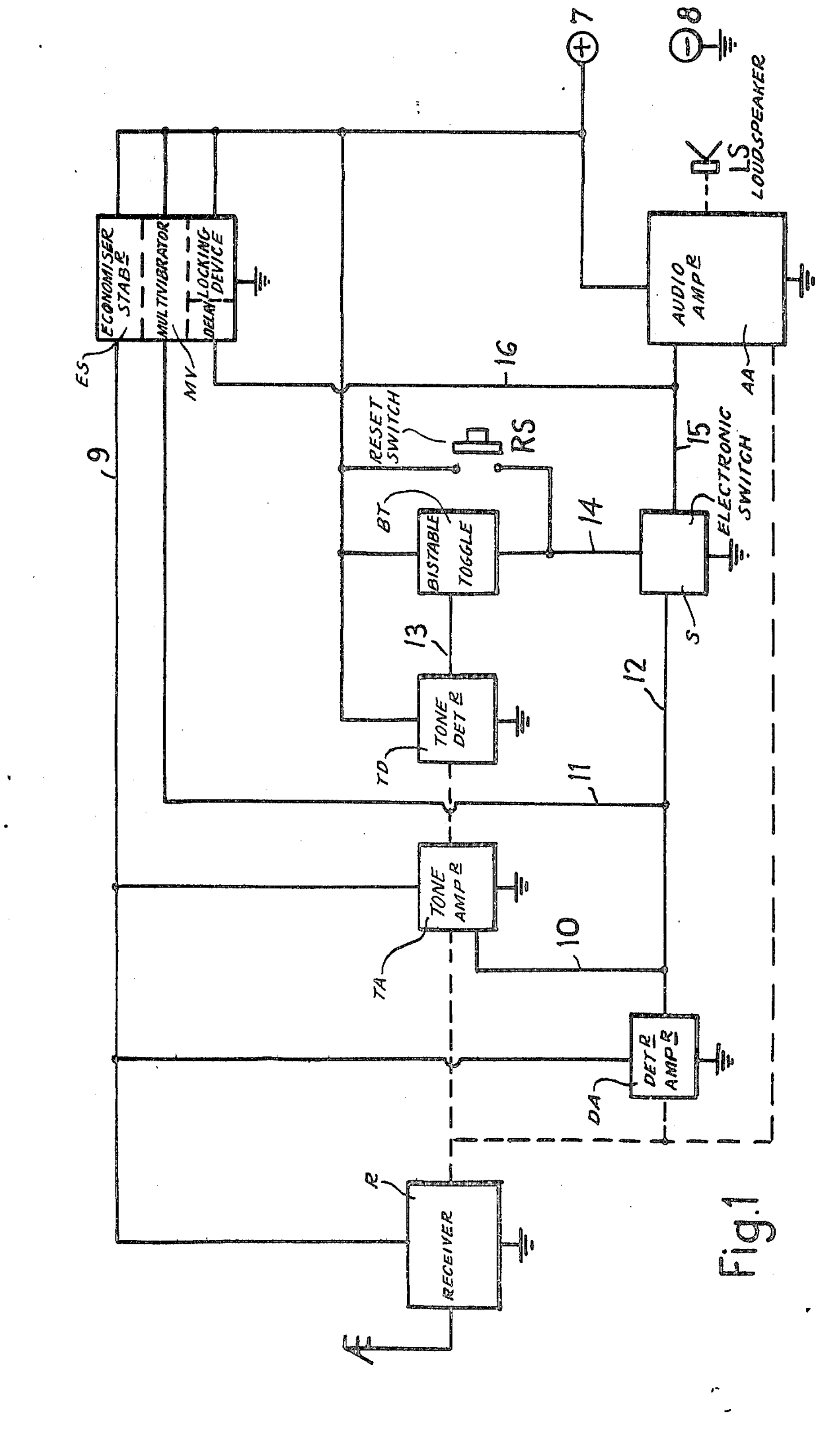
Figure 2:
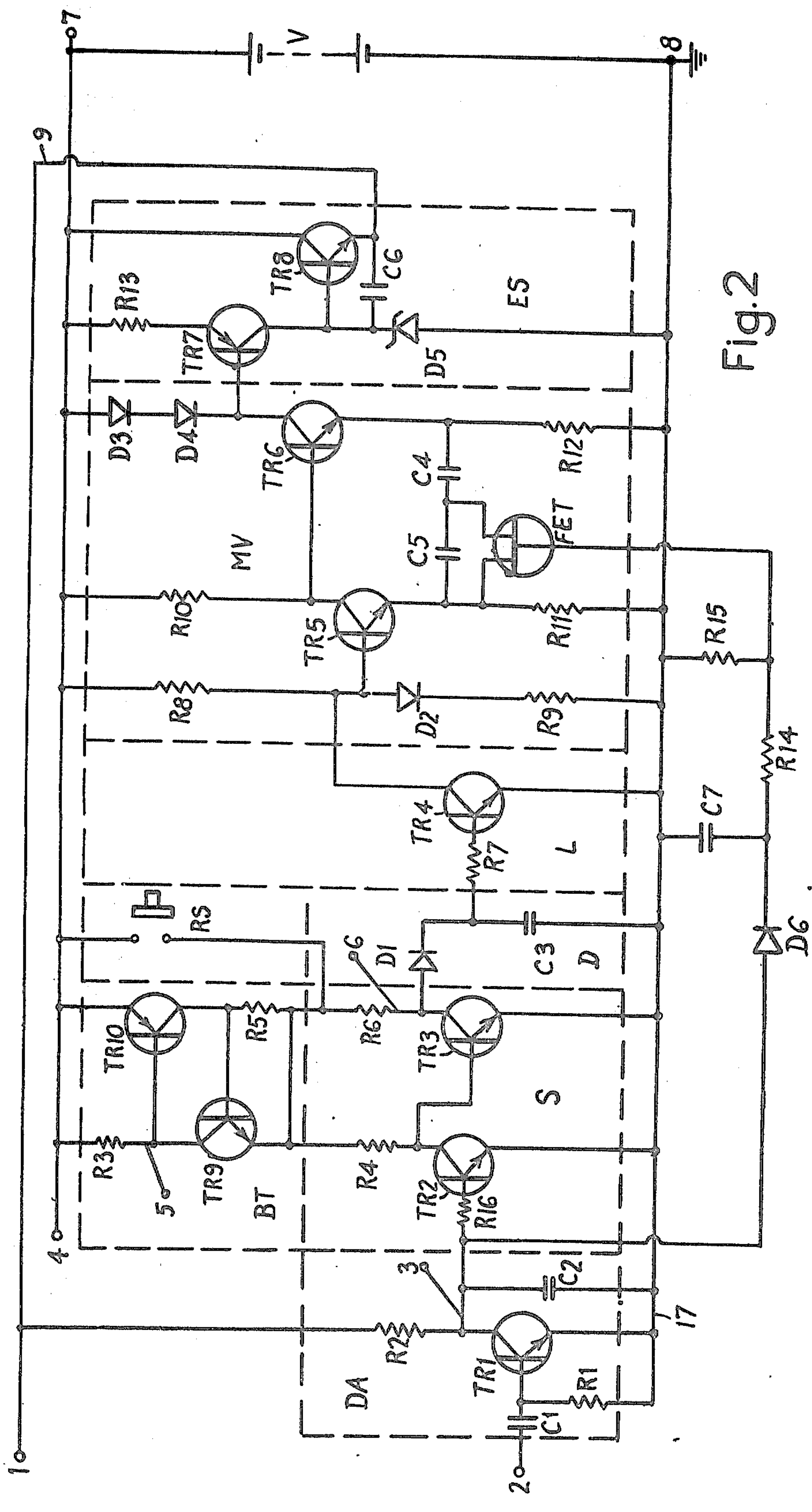

The invention will now be described, by way of example, with reference to the accompanying drawings, in which:

FIG. 1 is a block diagram of a receiver using one embodiment of the invention, and FIG. 2 is a circuit diagram of part of the receiver shown in FIG. 1.

In FIG. 1 battery power is applied to terminals 7 and 8 and the positive supply is fed from terminal 7 to an audio amplifier AA feeding a loudspeaker LS, a manually operated reset switch RS, a bistable toggle switch BT, a tone detector TD, an economizer/stabilizer ES, a two-speed multivibrator MV controlling the economizer, and a locking device L which can hold the stabilizer supply ON continuously. The economized/stabilized supply from ES is fed by supply line 9 to the front portion of a tone call radio receiver R which receives signals from the aerial AE and which includes all normal circuitry up to and including a discriminator. Line 9 also feeds a detector/amplifier DA and a tone amplifier and frequency selective filter TA. Both the audio amplifier AA and tone amplifier TA are arranged to be inoperative until supplied with a DC bias supply.

Audio and noise signals are taken from the receiver R over paths, shown in broken lines, to the tone amplifier TA and thence to the tone detector TD, to the detector/amplifier DA and to the audio amplifier AA.

The multivibrator MV is arranged so that normally it will be running at a low mark/space ratio (e.g. 1/50) and high speed with the line 9 switched at this speed so that the receiver R will respond rapidly to any signal received. On receipt of the carrier of such a signal the detector/amplifier DA produces a DC output which is passed as bias over line 10 to the tone amplifier TA to make this operative. The DC output is also passed over line 11 to the multivibrator MV to lower its speed while retaining the same mark/space ratio, and over line 12 to an open electronic switch S. If the correct calling tone is then received this will pass during a now longer ON period caused by the lower speed through the now operative tone amplifier and filter TA to the tone detector TD, the DC output from which passes over line 13 to operate the bistable toggle BT. Operation of the toggle BT applies the positive battery voltage over line 14 to close the electronic switch S, the DC output of the detector/amplifier DA then passing as bias over line 15 to make the audio amplifier AA operative and over line 16 to operate the locking device L and hold the economized/stabilized supply line 9 continuously ON. An active link is thus set up between the aerial AE and loudspeaker LS. Press and release of the reset switch RS will revert the bistable toggle BT to remove the positive battery voltage from the line 14, opening the electronic switch S and so rendering the audio amplifier inoperative. The locking device L will also, after a time lapse caused by a delay device D, cease to be operative, and the economized/stabilized supply line 9 will revert to being switched, the switching speed being fast in the absence of a carrier and low if a carrier is being received.

Referring to FIG. 2, some of the units of FIG. 1 are approximately indicated by rectangles, formed by broken lines and carry the same references as in that figure. The receiver battery V is applied to terminals 7 and 8 and provides power to switch RS and for operating transistors TR2 to TR10, and via terminal 4, for other directly fed units AA and TD as shown in FIG. 1.

Transistors TR5 and TR6 with associated components comprising resistors R8, R9, R10, R11 and R12, diodes D2, D3 and D4 and serially connected capacitors C4 and C5 form an emitter-coupled multivibrator (MV of FIG. 1), running with a mark/space ratio of approximately 1/50 and at a speed governed by the effective capacitance of the two capacitors in series, i.e. relatively fast with an ON period of some 10 milliseconds, whose output controls the operation of transistor TR7. Transistor TR8 the base of which is fed from the junction of Zener diode D5 and the collector of transistor TR7 and having a capacitor C6 between base and emitter, provides on line 9 an economized/stabilized supply fed to transistor TR1 and, via terminal 1 to the other units R and TA, as shown in FIG. 1. Apart from having two serially connected capacitors linking the emitters, the portion of the circuit comprising transistor TR5 to TR8 is similar to, and operates in the same way as, that described in my copending U.S. Pat. application Ser. No. 776,730.

A junction gate field effect transistor FET is arranged across the capacitor C5, of less capacitance than capacitor C4, the gate voltage of the field effect transistor determining the effective resistance appearing between source and drain, so that by application of the appropriate gate voltage the capacitor C5 may be effectively short circuited to leave the larger capacitor C4 only in circuit and reduce the multivibrator repetition rate, i.e. a relatively low speed, in which the ON period is of considerably greater duration, i.e. some 200 milliseconds.

The output of the discriminator of receiver R (FIG. 1) is fed via a filter (not shown in either figure) passing only a band of relatively high frequencies remote from the calling tone frequency and the frequencies used for speech, e.g. 8–12 kc., to terminal 2, coupled by capacitor C1 to the base of transistor TR1 (DA of FIG. 1), said base being connected to the earth line 17 by resistor R1. In the absence of a carrier during a power ON period the discriminator output will contain noise and that portion passed by the filter will be rectified by the base/emitter diode of transistor TR1 and cause it to conduct during positive portions of the noise waveform. Due to the ensuing voltage drop across the collector resistor R2 of transistor TR1 and the smoothing action of capacitor C2, the collector voltage will be low and substantially constant. This low collector voltage is applied via diode D6 to capacitor C7 and reduced by the potentiometer comprising resistors R14 and R15 before application to the gate of the field effect transistor FET, which will therefore be in a high-resistance condition. The two capacitors C4 and C5 are thus effectively in series and the multivibrator will run fast. On the receipt of a carrier, limiting and/or AGC action will reduce the gain of the receiver R and reduce the noise output to a low level. The collector voltage of transistor TR1 will thus rise positively, increasing the gate voltage of field effect transistor FET to reduce its source/drain resistance to a low value, and effectively short circuit capacitor C5. The capacitance controlling the speed of the multivibrator MV is thus substantially increased and the speed is reduced. The increase of collector voltage is passed from terminal 3 (and line 10 of FIG. 1) to make operative the tone amplifier TA of FIG. 1 and via a limiting resistor R16 to the base of transistor TR2, which with directly coupled transistor TR3 comprise the electronic switch S of FIG. 1. These transistors TR2 and TR3 are inoperative as transistors TR9 and TR10 (which comprise with resistors R3 and R5, the bistable toggle BT of FIG. 1) are nonconducting, and in the absence of the correct calling tone no further action occurs, as will also be the case when the received carrier is modulated with calling tone of incorrect frequency or with speech. When the received carrier is modulated with a short burst of the correct calling frequency, transistor TR1 is unaffected due to the bandpass filter between the discriminator and terminal 2, but the tone will be passed and amplified by the frequency selective filter and tone amplifier TA (FIG. 1), now biased into an operative condition, and then applied to the tone detector TD (FIG. 1) which will produce a DC output pulse. This DC output pulse is applied via line 13 (FIG. 1) and terminal 5 to the base of transistor TR10 to operate the bistable toggle (BT of FIG. 1) and allow current to flow to the collectors of transistors TR2 and TR3 through their collector resistors R4 and R6. The high voltage at the collector of transistor TR1 will then result in a high voltage at the collector of transistor TR3, and this is applied via terminal 6 and line 15 of FIG. 1 to bias the audio amplifier AA (FIG. 1) into an operative condition. Capacitor C3 will then be charged through diode D1 and base current for the transistor TR4 will flow through limiting resistor R7. Transistor TR4 will then conduct, drawing its collector current through resistor R8, so reducing the base voltage of transistor TR5 so that it is virtually nonconducting and therefore inoperative. With transistor TR5 off, transistor TR6, TR7 and TR8 will be on and line 9 will receive an uninterrupted stabilized supply.

After reception of the transmitted information, press and release of the reset switch RS will cut off both transistors TR9 and TR10 and silence the receiver by making the audio amplifier AA (FIG. 1) inoperative again. The reset switch can also be used to enable the operator to listen to signals other than those preceded by the calling tone applicable to the receiver, as whilst it is closed current flows through resistors R6 and R7, diode D1 and the base/emmiter diode of transistor TR4. The stabilized supply line is thus held uninterrupted and the audio amplifier made operative whilst the reset switch RS is held closed.

When the reset switch is released after closure, diode D1 prevents the discharge of capacitor C3 through transistor TR3 and transistor TR4 is held conducting for a short time, e.g. 2 seconds, whilst the capacitor discharges through the base circuit of TR4. Smoothing capacitor C2 has no diode in circuit to lengthen the time of discharge. Such delay in the release of the multivibrator is advantageous during reception of a signal in combating, for example, the effects that could be caused by the passage of the receiver through a small zone of low-signal strength, such as a radio shadow from an obstruction in the signal path, or one caused by an antiphased reflected signal. In a similar manner, diode D6 and capacitor C7 serve to prolong the duration of slow-speed running of the multivibrator MV after the collector voltage of TR1 falls from a high value.

It should be noted that, in the absence of an incoming signal, noise is only available at terminal 2 when the receiver is supplied with power by line 9 and terminal 1. In the OFF condition no noise is available at terminal 2 but the collector voltage of transistor TR1 does not rise and operate the FET switch as transistor TR1 is also supplied from line 9. Such a connection also reduces the total battery consumption as during an OFF period the only transistor in FIG,. 2 which is conducting is transistor TR5.

Whilst the invention has been specifically described as applied to a stabilized economy circuit, as described in my copending U.S. Pat. application Ser. No. 776,730, it may also be applied to an economy circuit as described in U.S. Pat. No. 3,488,596

I claim:

1. A battery economizer circuit for obtaining reduced power consumption from the battery supply to a radio receiver in the absence of an incoming signal including a semiconductor switch device for rendering a direct-current path from the battery to the receiver alternately conductive and nonconductive, a multivibrator circuit for controlling the switching of said switch device, said multivibrator circuit including two semiconductor devices and two serially connected capacitors used as the frequency-determining capacitance of said multivibrator circuit and connected between the corresponding electrodes of said two semiconductor devices, means for short circuiting one of said capacitors, upon receipt of a carrier wave signal, to lower the repetition rate of said multivibrator circuit whilst maintaining the mark/space ratio substantially constant and means for maintaining said switch device in the conductive position upon receipt of a predetermined tone modulation of said carrier.

2. A circuit as claimed in claim 1, wherein said means for short circuiting said one capacitor comprises a further semiconductor device connected across said capacitor, and means for applying a control voltage derived from said received carrier wave signal to an electrode of said further semiconductor device to produce said short circuit.

3. A circuit as claimed in claim 2 comprising means for rectifying a part the noise signal generated in the receiver in the absence of a received signal and means for applying the rectified signal as the control voltage to the control electrode of said further semiconductor device to hold it in a high resistance condition so that the two capacitors are effectively in series and the multivibrator has a high repetition rate.

4. A receiver as claimed in claim 1, including an electronic switch, a bistable toggle circuit and an audio amplifier and wherein the receipt of said predetermined tone modulation operates said bistable toggle circuit to close said electronic switch to pass said tone modulation to said audio amplifier, and a locking device also operated by the receipt of said predetermined tone modulation to hold said switching device continuously conductive.

5. A receiver as claimed in claim 4, including a manually operated reset switch effective to reset said bistable toggle circuit and open the electronic switch and thereby render the audio amplifier inoperative; and also effective to cause said switching device to revert to its faster speed which it assumes in the absence of a received carrier signal.